United States Patent [19]
Ishida et al.

[11] Patent Number: 5,202,149
[45] Date of Patent: Apr. 13, 1993

[54] METHOD FOR MAKING A MAGNETIC RECORDING MEDIUM

[75] Inventors: Tatsuaki Ishida, Sakai; Ryuji Sugita; Kiyokazu Tohma, both of Hirakata; Kazuyoshi Honda, Takatsuki; Yasuhiro Kawawake, Suita; Yoshiki Goto, Kitakatsuragi, all of Japan

[73] Assignee: Matsushita Electric Industrial Co., Ltd., Kadoma, Japan

[21] Appl. No.: 892,478

[22] Filed: Jun. 2, 1992

Related U.S. Application Data

[63] Continuation of Ser. No. 735,030, Jul. 24, 1991, abandoned.

[30] Foreign Application Priority Data

Jul. 25, 1990 [JP] Japan .................. 2-197325

[51] Int. Cl.$^5$ .................................. B05D 3/06
[52] U.S. Cl. ......................... 427/534; 156/643; 204/192.32; 204/192.34; 204/192.35; 427/130; 427/131; 427/132; 428/694; 428/900; 428/928
[58] Field of Search ............ 427/38, 130, 131, 132; 156/643; 204/192.32, 192.34, 192.35; 428/694, 900, 928

[56] References Cited

U.S. PATENT DOCUMENTS

| | | | |
|---|---|---|---|
| 4,642,270 | 2/1987 | Morita et al. | 428/621 |
| 4,683,149 | 7/1987 | Suzuki et al. | 427/38 |
| 4,770,924 | 9/1988 | Takai et al. | 427/131 |

FOREIGN PATENT DOCUMENTS

| | | |
|---|---|---|
| 3443601 | 6/1985 | Fed. Rep. of Germany . |
| 60-117413 | 6/1985 | Japan . |
| 61-139919 | 6/1986 | Japan . |
| 62-204427 | 9/1987 | Japan . |
| 62-234239 | 10/1987 | Japan . |
| 2072406 | 9/1981 | United Kingdom . |

OTHER PUBLICATIONS

Patent Abstracts of Japan, vol. 8, No. 181 (E-261) (1618), Aug. 21, 1984, abstracting JP-A-59-74607.
Patent Abstracts of Japan, vol. 8, No. 183 (P-296) (1620) Aug. 23, 1984, abstracting JP-A-59-75426.
Patent Abstracts of Japan, vol. 010, No. 152 (P-462), Jun. 3, 1986, abstracting JP-A-61-005424.
R. Sugita, et al., "Vacuum Deposition of Co-Cr Perpendicular Anisotropy Films on Polymer Substrates Treated with Ion Beam", IEEE Transactions on Magnetics, vol. 25, No. 5, Sep. 1989, pp. 4183-4185.
Patent Abstracts of Japan, vol. 12, No. 102, (P684)5, Apr. 11, 1988.

Primary Examiner—Bernard Pianalto
Attorney, Agent, or Firm—Cushman, Darby & Cushman

[57] ABSTRACT

In the method for making the magnetic recording wherein a first magnetic layer is formed on a substrate and a second magnetic layer is formed on the first magnetic layer, before forming the second magnetic layer, accelerated ions are irradiated onto a surface of the first magnetic layer. Thereby, naturally formed oxidized layer and adhered impurity on the first magnetic layer are removed from the surface of the first magnetic layer by ion etching action by the irradiation of ions, and hence a preferable condition of an interface between the first magnetic layer and subsequently formed second magnetic layer is obtained.

6 Claims, 6 Drawing Sheets

METHOD FOR MAKING A MAGNETIC RECORDING MEDIUM

This is a continuation of application Ser. No. 07/735,030, filed on Jul. 24, 1991, which was abandoned upon the filing hereof Ser. No. 892,478 on Jun. 2, 1992.

FIELD OF THE INVENTION AND RELATED ART STATEMENT

1. Field of the Invention

The present invention relates to a method for making a magnetic recording medium which has a multilayer magnetic film formed on a non-magnetic substrate.

2. Description of the Related Art

In recent years, a small sized magnetic recording/reproducing apparatus has been developed and a magnetic recording medium having high recording density performance has been investigated. A thin metal film type magnetic recording medium has lately attracted considerable attention as one of most favorable magnetic recording media which exceeds the limit of recording density performance in the conventional particulate magnetic recording medium. The thin metal film type magnetic recording medium can be formed by a plating method, a sputtering method, a vacuum evaporation method or the like. In consideration for mass production, the vacuum evaporation method is the most preferable method. In order to make the thin metal film type magnetic recording medium with high and stable productivity by the vacuum evaporation method, for instance, a web coater type continuous deposition apparatus is used. In the web coater type continuous deposition apparatus, when a tape-shaped substrate consisting of high polymer film is transferred along on the circumference of a cylindrical can, a thin metal film is deposited on the substrate.

A perpendicular magnetic recording medium utilizing Co-Cr or Co-O as a main content of the thin metal film is a favorable thin metal film type magnetic recording medium in the next generation. And the above-mentioned vacuum evaporation method has been also used in research to make the perpendicular magnetic recording medium.

In addition to the above-mentioned vacuum evaporation method for forming the magnetic recording medium, such an important technique as previous treatment for the substrate of high polymer and a subsequent treatment for the magnetic recording film have been investigated. For instance, according to the gazette of the Japanese published unexamined patent application (Tokkai) sho 62-234239, before forming by the vacuum evaporation method the magnetic recording film mainly consisting of Co and Cr on the high polymer film. Irradiation of accelerated ions onto the substrate is disclosed as a previous treatment. And according to the art of Tokkai Sho 62-234239, improved magnetic characteristics and recording/reproducing characteristic are obtained.

In recent years, in order to improve recording/reproducing characteristic, a multilayer magnetic recording film has been investigated. For instance, according to "High-density magnetic recording properties of evaporated Co-Ni-O thin film" Yoshida and Shinohara, Proceedings of PMRC'89, P139 1989, improvement of recording/reproducing characteristic has been carried out owing to a multilayer configuration of the thin metal type magnetic recording film mainly consisting of Co-Ni-O. Further, in the perpendicular magnetic recording medium having the magnetic recording film mainly consisting of Co-Cr or Co-O, when recording-/reproducing is carried out by utilizing a ring-shaped magnetic head, a configuration of two layers results in high reproduced output, improvement of isolated waveform and improved frequency response of reproduced output. And the art is disclosed in commonly assigned U.S. Patent Application entitled "Magnetic recording medium and method for producing the same" having Ser. No. 07/574,285, filed Aug. 28, 1990.

When recording/reproducing is carried out by utilizing magnetic singlepole head, recording efficiency can be improved by forming a soft magnetic film e.g. Ni-Fe film which intervenes between the substrate and the perpendicular magnetic recording film. In a procedure for forming a multilayer film (hereinafter, for instance, which consists of a first magnetic layer, second magnetic layer and so on). It is very difficult to keep the state of the interface between each magnetic layer in good condition. Causes of deterioration of the interface are as follows: undesirable oxidized layer is naturally formed on the surface of the first magnetic layer before forming the second magnetic layer and/or undesirable impurity such as inorganic material is adhered on the first magnetic layer before forming the second magnetic layer. The oxidized layer and the impurity result in not only increased spacing loss but also decreased preferable interface effect between the magnetic layers. As a result, recording/reproducing characteristic is remarkably deteriorated.

As to the oxidized layer, it is possible to considerably repress undesirable oxidization when the second magnetic film is formed continuously after formation of the first one in one vacuum chamber without exposing the surface of the first one to the atmosphere. But it is difficult to get a high vacuum in such a large scale apparatus as is suitable for mass production. Thus, sufficient repress of oxidization has not been realized. Especially ,in case a reactive deposition or a reactive sputtering is carried out under introduced oxygen atmosphere in order to form the magnetic layer, or in case a process under a high temperature is necessary, it is impossible to repress oxidization perfectly.

When an apparatus which utilizes a cylindrical can is used in order to form two magnetic layers continuously in one vacuum chamber, it has been considered necessary to use two cylindrical cans (i.e. a first cylindrical can for the first magnetic layer and a second cylindrical can for the second one). Since a speed of the magnetic recording medium transferred on the first cylindrical can must be the same as that of the same transferred on the second cylindrical can, it becomes very difficult to control rotation speed of each cylindrical can and to select suitable conditions such as deposition rate of each magnetic film. In contrast, when each magnetic layer is not formed continuously, that is, each magnetic layer is formed under respective suitable condition, stable deposition can be obtained with ease, and hence large productivity is obtained. Thus, in consideration for productivity, it is not suitable to form two magnetic layers continuously.

As mentioned above, in the related arts, it has been difficult to solve the problems due to formation of the oxidized layer and that of the adhering impurity with ease.

OBJECT AND SUMMARY OF THE INVENTION

The present invention is intended to solve the above-mentioned problem. The purpose of the present invention is to provide a method for making a magnetic recording medium which has improved recording/reproducing characteristics.

The method for making a magnetic recording medium in accordance with the present invention is characterized by:

in a method for making a magnetic recording medium wherein at least two magnetic layers are formed on a substrate.

the improvement that before forming on a previous or underlying magnetic layer a subsequent or overlying magnetic layer, accelerated ions are irradiated onto a surface of the previous magnetic layer.

In the above-mentioned method for making the magnetic recording medium, effect of the irradiation of accelerated ions originates from ion etching action thereof. That is, undesirable oxidized layer and adhered impurity are removed from the surface of the previous magnetic layer by the ion etching action. Thereby, a preferably condition of an interface between the previous magnetic layer and the subsequent magnetic layer is realized, so that an improved recording/reproducing characteristic is obtained as the effect. In order to obtain sufficient effect, it is preferable to carry out the irradiation of accelerated ions immediately before forming the subsequent magnetic layer. Thereby, there is little possibility of formation of undesirable oxidized layer or the like again after the irradiation of accelerated ions.

The method of the present invention is applicable not only to the magnetic recording film consisting of two magnetic layers but also to that consisting of not less than three magnetic layers wherein the effect is obtained in forming any subsequent magnetic layer after forming a previous magnetic layer. That is, when the magnetic recording film consisting of n magnetic layers (n is a natural number greater than or equal to 2), the improvement by the present invention is obtainable in respective interfaces to the number of n−1 which exist between respective magnetic layers.

In order to produce ions, there is such a usable ion source as a Kaufman type ion gun. Usable ions are ionized inert gas such as noble gas (e.g. argon) and nitrogen gas which is inactive to the magnetic layer. The ion source can be used insofar as a high vacuum is kept in the vacuum chamber, and the high vacuum should be kept usually in order to use a conventional method for making the thin film type magnetic recording medium such as a vacuum evaporation method. Thus, there is no limitation about use of the ion source in the method. When the afore-mentioned reactive deposition is carried out, for instance Co-Ni-O film is formed by introducing oxygen gas; and the same effect of the ion etching action as that of the above-mentioned deposition is obtained. Thus, the improvement in the method of the present invention is widely applicable in the conventional method for making the thin metal film type magnetic recording medium.

There is a cobalt-based magnetic layer as a recording layer in most of the thin metal film type magnetic recording medium which has been investigated in order to realize high density recording. In case at least one magnetic layer which is between the previous one and the subsequent one is a cobalt-based magnetic layer, the remarkable effect of the present invention is obtained. Especially, in case each of the previous magnetic layer and the subsequent one is a cobalt-based magnetic layer which has a recorded magnetization component in a direction perpendicular to a plane of the magnetic recording medium, a remarkable improvement of recording/reproducing characteristics is obtained by the method of the present invention. The improvement is mainly made by reduced spacing loss through removal of the oxidized layer and impurity on the interface between the previous magnetic layer and the subsequent magnetic layer.

As to a cobalt-based perpendicular magnetic recording medium which is assumed to be used with a monopole magnetic head in recording/reproducing, when a cobalt-based perpendicular magnetic recording film is formed as an overlying second (subsequent) magnetic layer after irradiation of accelerated ions onto a soft magnetic layer of Ni-Fe or the like as an underlying first (previous) magnetic layer, good interface condition between the previous one and the subsequent one is realized. Thus, intended interface effect is not reduced; and higher recording efficiency is obtained.

As mentioned above, in accordance with the method of the present invention, in the magnetic recording medium wherein the multilayer magnetic film was formed on the substrate, good interface condition between each magnetic layer is realized so that improvement of recording/reproducing characteristic is obtained. Thus, the present invention provides a most effective method for making the magnetic recording medium having the multilayer magnetic layers.

While the novel features of the invention are set forth particularly in the appended claims, the invention, both as to organization and content, will be better understood and appreciated, along with other objects and features thereof, from the following detailed description taken in conjunction with the drawings.

It will be recognized that some or all of the Figures are schematic representations for purposes of illustration and do not necessarily depict the actual relative sizes or locations of the elements shown.

DESCRIPTION OF THE PREFERRED EMBODIMENTS

Hereafter, preferred embodiments of the present invention are explained with reference to the accompanying drawings.

Figure 1:
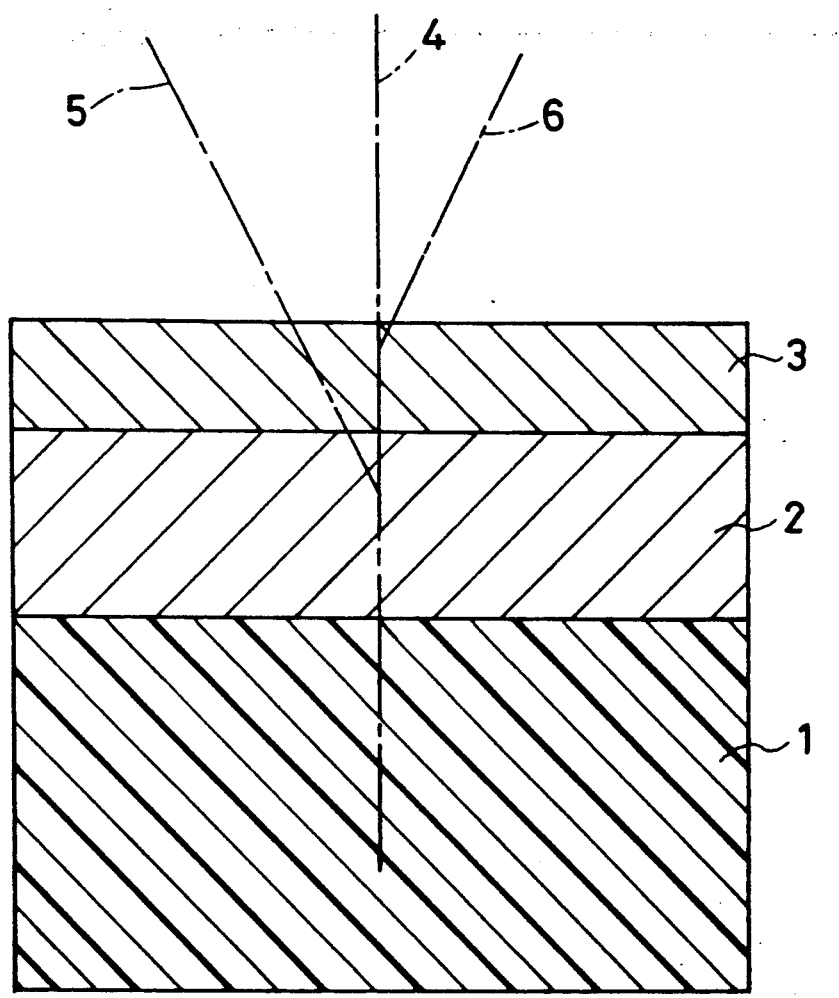
FIG. 1 is a cross sectional view of the magnetic recording medium which is made by the method of the present invention.

FIG. 1 is a cross sectional view of the magnetic recording medium which is made by the method of the present invention. A first magnetic layer 2 as a previous magnetic layer is formed first on a substrate 1 of high polymer. A second magnetic layer 3 as the overlying or subsequent magnetic layer is subsequently formed on the first magnetic layer 2. The substrate is usually made of high polymer, and non-magnetic metal such as aluminum or depending on necessity, ceramic may be used for making the substrate especially for use in disk shaped recording medium. Suitable materials for the substrate made of high polymer include: polyethylene terephtalate (Hereinafter referred to as PET and polyethylene naphthalate (Hereinafter referred to as PEN). And if a high heat resistivity is necessary, polyimide (Hereinafter referred to as PI) or polyamide (Hereinafter referred to as PA) is used for the substrate. The above-mentioned materials are suitable for use in a continuous deposition apparatus which is elucidated later. For use in the disk shaped recording medium, polycarbonate (Hereinafter referred to as PC) or acrylic resin such as PMMA (poly (methylmethacrylate)) is used for making the substrate.

In FIG. 1, the magnetic recording medium has both the first magnetic layer 2 and the second magnetic layer 3 which were cobalt-based magnetic layers, and it was shown as the most effective example of the present invention. In the magnetic recording medium shown in FIG. 1, the first magnetic layer 2 has an easy axis 5 which is slant by a certain angle to the normal 4 of the plane of the magnetic recording medium, and the second magnetic layer 3 has an easy axis 6 which is also slant by a certain angle to the normal 4 similarly. When the magnetic recording medium having cobalt-based magnetic layers has the above-mentioned multilayer configuration, high reproduced output, improved isolated waveform and improved frequency response of reproduced output are obtainable as disclosed in U.S. patent application Ser. No. 07/574,285, which is mentioned afore. Suitable materials to be used in the cobalt-based first and second magnetic layers can be chosen properly from the alloys: Co-O, Co-Ni-O, Co-Cr, Co-Ni-Cr and Co-V, these alloys including at least one element selected from transition metal elements in iron group such as Fe, Cu ad Mn, noble metals such as Pt and Pd and other elements such as C, B and P as additive.

Through our experiments, when the first magnetic layer mainly consisted of Co-Cr or Co-Ni-Cr and the second magnetic layer mainly consisted of Co-O or Co-Ni-O, the most improved recording/reproducing characteristic was obtained in the above-mentioned magnetic layers.

When the first magnetic layer mainly consists of Co-Cr or Co-Ni-Cr, high reproducing output is obtained not only in a range of high recording density but also in a range of low recording density; and a high S/N ratio is obtained in a wide range. Further, when the second magnetic layer is a partly oxidized layer which mainly consists of Co-O or Co-Ni-O, high reliability in tribology including smooth sliding contact with head and the like is obtained. Thus, the above-mentioned combination of the first and second magnetic layers results in having the most improved recording/reproducing characteristic.

Concerning the above-mentioned experiments of ours, elucidation is made on a magnetic recording medium having a Co-Cr film as the first magnetic layer and a Co-O film as the second one in the below-mentioned embodiments.

1. FIRST EMBODIMENT

Figure 2:
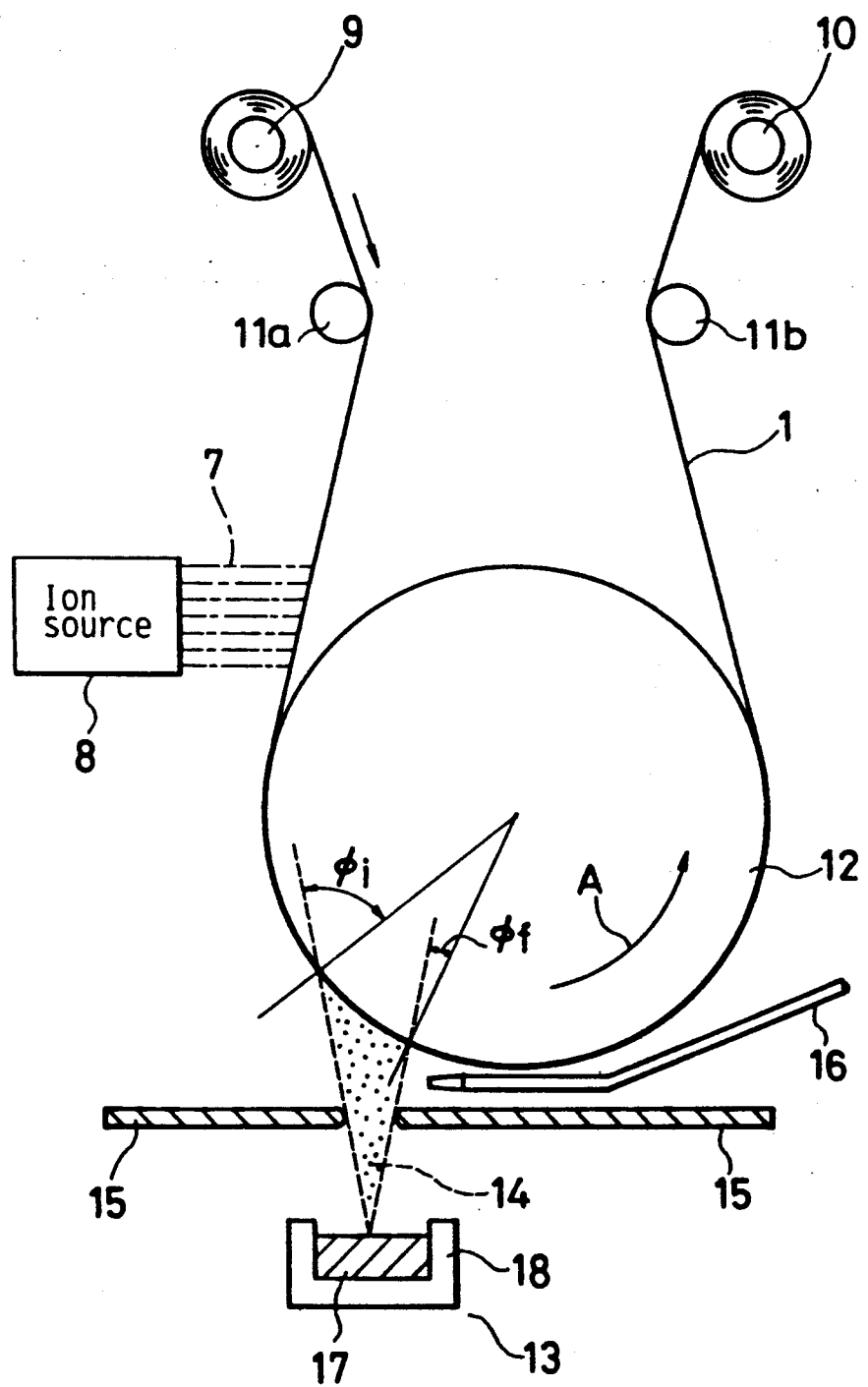
FIG. 2 is a side view of a first embodiment of a continuous vacuum evaporation apparatus for making the magnetic recording medium embodying the present invention.

FIG. 2 is a side view of a first embodiment of a continuous vacuum evaporation apparatus for making the above-mentioned magnetic recording medium embodying the present invention. The continuous vacuum evaporation apparatus is set in a vacuum chamber (not shown in FIG. 2). Magnetic material 17 is melting in a melting pot 18 and it serves as an evaporation source 13. Over the evaporation source 13, a substrate 1 consisting of high polymer film rolled on a supplying reel 9 is fed out and transferred on the circumference of a rotating cylindrical can 12, whereon evaporated atoms 14 of the magnetic material is deposited on the substrate 1 in transferring. And the substrate 1 is wound up by and on a winding reel 10. The cylindrical can 12 rotates as shown by an arrow A.

Unnecessary flow of evaporated atoms is obstructed by shielding plates 15, 15. The shielding plates 15, 15 are disposed in a manner that it enables the flow of evaporated atoms 14 within the range of incident angle from an initial incident angle $\phi i$ to a final incident angle $\phi f$ against the normal to the plane of the substrate. In a cobalt-based magnetic recording film, an easy axis which is slant by an angle to the normal to the plane of the substrate is obtained owing to the evaporated atoms deposited in a suitable range of the incident angle.

When a Co-Cr film is formed as a first magnetic layer, a Co-Cr alloy is used for the evaporation source 13. When a partially oxidized film such as a Co-O film is formed as a second magnetic layer, Co in the free state is used for the evaporation source 13. And a nozzle 16 is disposed between the evaporation source 13 and the cylindrical can 12 in order to flow oxygen into the evaporated atoms so that reactive deposition is carried out with introducing oxygen.

That is, after the first magnetic layer is formed by utilizing the continuous evaporation apparatus shown in FIG. 2 without using the nozzle 16, the second magnetic layer is also formed by utilizing the same apparatus wherein the evaporation source 13 is changed from Co-Cr alloy to Co in the free state and the nozzle 16 for blowing of oxygen is used.

When the second magnetic layer is formed, ions 7 are irradiated from an ion source 8 onto a surface of the first magnetic layer immediately before forming the second magnetic layer so that oxidized layer and impurity on the first magnetic layer is removed. The ion source 8 is disposed in a manner that irradiation is made on a part of the substrate 1 which runs at a vicinity of entering side of the cylindrical can 12.

That is, formation of the second magnetic layer is carried out immediately after irradiation of ions. Thereby, even if oxygen is introduced into the vacuum chamber for the reactive deposition, there is very little possibility that an oxidized layer is formed again on the surface of the first magnetic layer.

Removal of the oxidized layer and impurity on the first magnetic layer ows to ion etching action of the irradiated ions. For instance, when a Kaufman type ion gun is used as the ion source 8, the larger the accelerating voltage of ions and ion current density become, usually the stronger the ion etching action becomes. But in case these values becomes too large, it is likely that undesirable problems occur. For instance, undesirable thermal deformation of the substrate 1 occurs and/or ion etching action influences other member in the vacuum chamber to produce impurity. Thus, depending on circumstances, it is necessary to select optimal condition concerning the accelerating voltage and the ion current density and the like.

Example 1

Video tape samples of this example 1 which have the same cross sectional view shown in FIG. 1 were formed by using the first embodiment of the continuous evaporation apparatus shown in FIG. 2. An alloy of Co-Cr was used as the evaporation source 13. A Co-Cr layer as the first magnetic layer 2 was formed on a substrate 1, which was made of polyimide as a heat-stable high polymer.

Deposition of the first magnetic layer was carried out under the following condition: the initial incident angle $\phi i$ was 60°, and the final incident angle $\phi f$ was 30°. Saturation megnetization of the Co-Cr layer was 450 emu/cc, and the thickness of the same was 120 nm. The substrate 1 was kept at 270° C. during deposition.

After deposition of the first magnetic layer 2 was finished, the pressure in the vacuum chamber was changed to atmospheric pressure by introducing air. And several operations were made, for instance the evaporation source was changed from Co-Cr to Co.

The vacuum chamber was evacuated again so that a Co-O layer as the second magnetic layer 3 was formed on the first magnetic layer 2. The Co-O layer was formed by the reactive evaporation method utilizing oxygen introduced through the nozzle 16. Immediately before forming the second magnetic layer 3, accelerated ions 7 were irradiated onto the surface of the Co-Cr film as the first magnetic film 2. That is, the irradiation was made onto the surface of the first magnetic film 2 which runs at a vicinity of entering side of the cylindrical can 12. A Kaufman type ion gun was used as the ion source 8, and argon gas was introduced into the ion gun so that argon ions irradiated as ions 7. The accelerating voltage of ions was 500 V, and the ion current density was about 600 $\mu A/cm^2$.

Deposition of the second magnetic layer 3 was carried out under the following condition: the initial incident angle $\phi i$ was 50°, and the final incident angle $\phi f$ was 15°. Saturation magnetization of the Co-O layer was 650 emu/cc, and thickness of the same as 50 nm. The substrate 1 was kept at 100° C. during deposition of the Co-O layer. The deposited film was slit to give sample video tapes.

Comparison Example 1

Video tape samples of this Comparison example 1 were made by the same procedure as that of the Example 1 except that no irradiation of accelerated ions were made onto the surface of the first magnetic layer 2.

2. SECOND EMBODIMENT

Example 2

Figure 3:
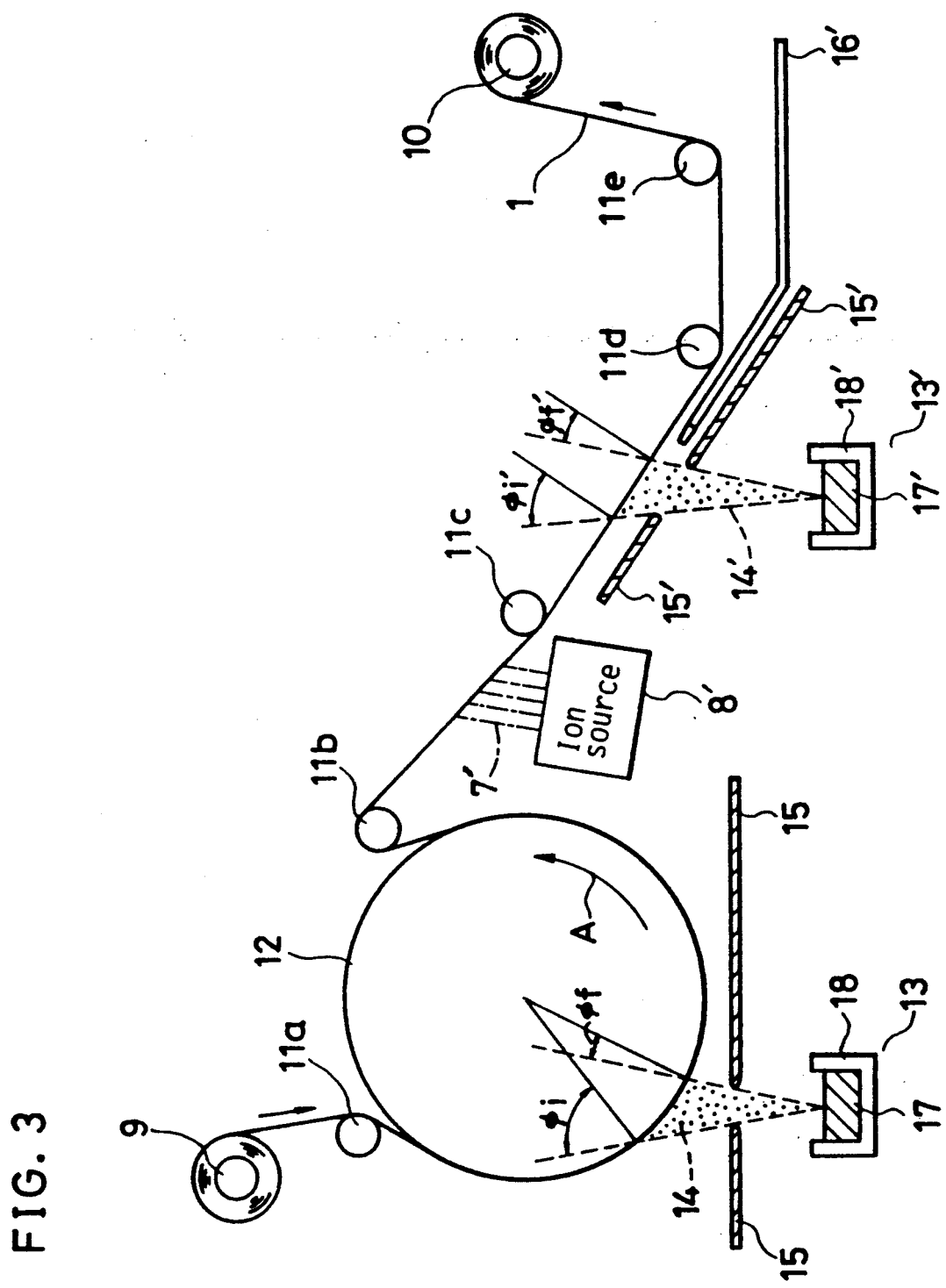
FIG. 3 is a side view of a second embodiment of a continuous vacuum evaporation apparatus for making the magnetic recording medium embodying the present invention.

Video tape samples of this Example 2 which have the same cross sectional view shown in FIG. 1 were formed by using a second embodiment of the continuous evaporation apparatus shown in FIG. 3. Corresponding parts and components to the first embodiment are shown by the same numerals and marks, and the description thereon made in the first embodiment similarly apply. Differences and features of this second embodiment from the first embodiment are as follows. In the continuous evaporation apparatus, both the first magnetic layer 2 and the second magnetic layer were continuously formed in the same vacuum chamber (not shown in FIG. 3) by using only one cylindrical can 12. Thus, the surface of the first magnetic layer was never exposed to the atmosphere. An alloy of Co-Cr was used as the evaporation source 13, and a Co-Cr layer as the first magnetic layer 2 was formed on the substrate 1.

During the while the substrate 1 was transferred on the circumference of the rotating cylindrical can 12, deposition of the first magnetic layer 2 was carried out under the following condition: the initial incident angle $\phi i$ was 60°, and the final incident angle $\phi f$ was 30°. Saturation magnetization of the Co-Cr layer was 450 emu/cc, and the thickness of the same was 120 nm. The substrate 1 was kept at 270° C. during deposition.

After the above-mentioned deposition, ions 7' from the ion source 8' were irradiated onto the surface of the first magnetic layer 2 which runs between guide rollers 11b and 11c immediately before forming the second magnetic layer 3. The substrate 1 was supported only by the guide rollers 11b and 11c therebetween.

Co was used as an evaporation source 13', and a Co-O layer as the second magnetic layer 3 was formed on the first magnetic layer 2 between guide rollers 11c and 11d. The substrate 1 was supported only by the guide rollers 11c and 11d without supporting member e.g. a cylindrical can therebetween. The Co-O layer was formed by the reactive evaporation method utilizing oxygen introduced through the nozzle 16' which was disposed between the substrate 1 and the evaporation source 13'.

In the above-mentioned apparatus, it was not necessary to use two cylindrical cans at the same time. Thus, it was not difficult to control running speed of the substrate 1 and to select suitable conditions such as respective deposition rates of the first and second magnetic layers.

When the second magnetic layer 3 is formed in the apparatus, possibly the substrate 1 is deteriorated by heat due to energy of evaporated atoms 14'. Thus, the material of the substrate 1 should have a high glass transition temperature, and deposition rate and the like should be limited below a certain level. In case the second magnetic layer 3 is formed by utilizing the cylindrical can 12 in the same way as the first magnetic layer 2, heat due to the evaporated atoms 14 is rapidly absorbed by the cylindrical can 12, and the above-mentioned deterioration by heat never occurs. But in the apparatus shown in FIG. 3, the heat of the substrate 1 can not be removed. In this Example 2, the deposition rate of the second magnetic layer was smaller than a quarter of that of the first magnetic layer, and by using polyimide having a glass transition temperature above 300° C. for the substrate 1 a stable deposition was made without deterioration of the substrate by using the apparatus. A Kaufman type ion gun was used as an ion source 8', and argon gas was introduced into the ion gun so that argon ions were irradiated as ions 7'. The accelerating voltage of ions was 500 V, and the ion current density was about 600 $\mu A/cm^2$.

Deposition of the second magnetic layer 3 was carried out under the following condition: the initial angle $\phi i'$ was 45°, and the final incident angle $\phi f'$ was 40°. Saturation magnetization of the Co-O layer was 650 emu/cc, and thickness of the same was 50 nm. The substrate 1 was kept at 180° C. during deposition of the Co-O layer. The resultant film was slit to give sample video tapes.

Comparison Example 2

Video tape samples of this Comparison example b 2 were made by the same procedure as that of the Example 1 except that no irradiation of accelerated ions were made onto the surface of the first magnetic layer 2.

The following evaluation test was made on tape samples obtained in the foregoing examples and comparison examples.

Recording/Reproducing Characteristic

Recording/reproducing was made on the tape sample by utilizing a ring-shaped magnetic head. Reproduced voltage was measured by changing frequency of signal.

Figure 4A:
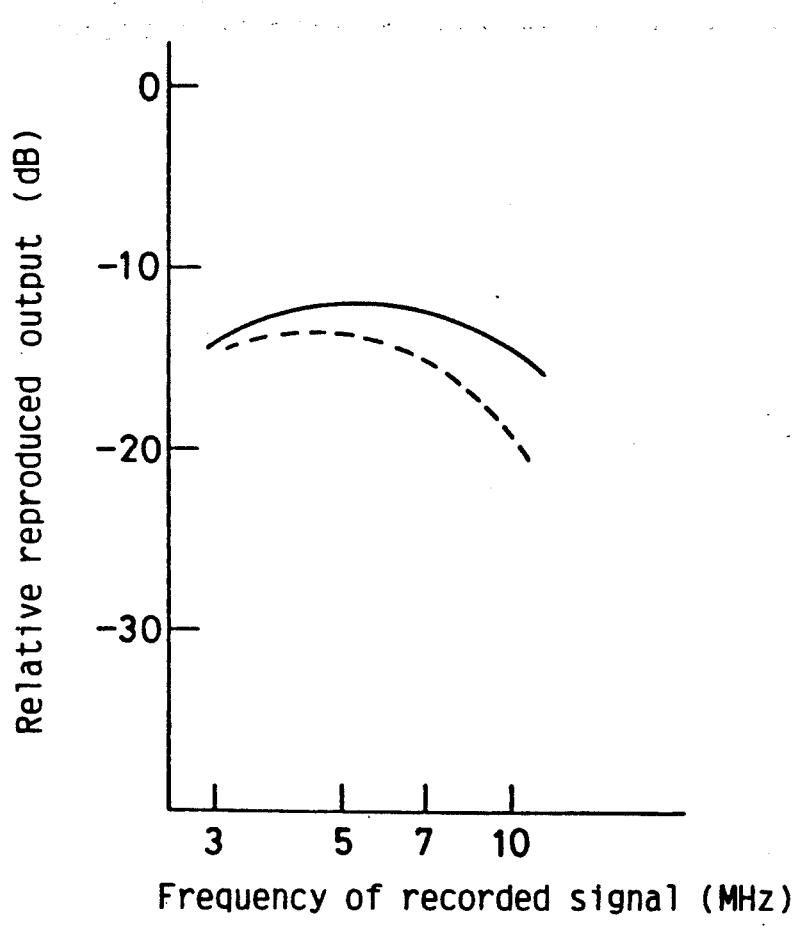
FIG. 4(a) is a graph showing the frequency response of relative reproduced output of the Example 1 and the Comparison example 1.
Figure 4B:
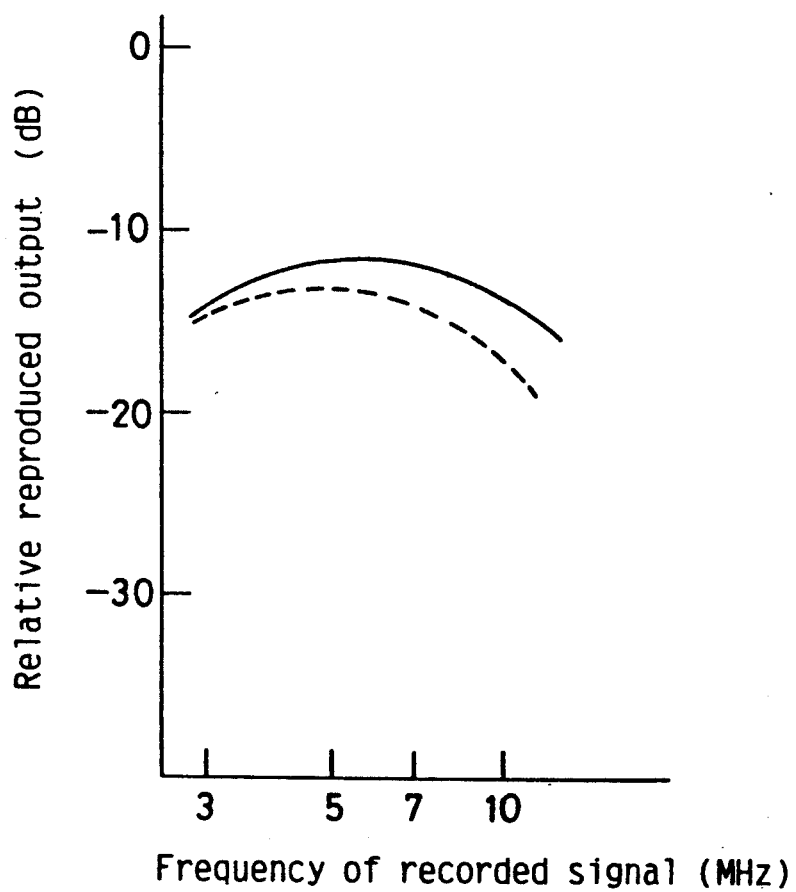
FIG. 4(b) is a graph showing the frequency response of relative reproduced output of the Example 2 and the Comparison example 2.

FIG. 4(a) is a graph showing the frequency response of relative reproduced output of the Example 1 and the Comparison example 1. FIG. 4(b) is a graph showing the frequency response of relative reproduced output of the Example 2 and the Comparison example 2.

FIGS. 4(a) and 4(b) show that relative reproduced output of the Examples 1 and 2 were higher than that of the Comparison examples 1 and 2 respectively. Thus, improvement of recording/reproducing characteristic is obtained by the method of the present invention for making the magnetic recording medium. Technical advantage of the present invention obtained in the Embodiment 1 was more remarkable than that obtained in the Embodiment 2, the reason why would be that by the Embodiment 2 a relatively thin oxidized layer was formed on the first magnetic layer in the Experiment 2. Both the first magnetic layer and the second one were formed in one vacuum chamber continuously, so that the second magnetic layer was formed without exposing the first magnetic layer under atmosphere, and thereby thinner oxidized layer than that of the Experiment 1 was formed in the Experiment 2.

Effect of the present invention was more remarkable in the characteric in high frequency region in both the embodiments 1 and 2. The reason would be that undesirable spacing loss was reduced owing to removal of the oxidized layer and impurity.

3. THIRD EMBODIMENT

In both the continuous evaporation apparatuses shown in FIGS. 2 and 3, in order to let the substrate 1 and the cylindrical can 12 make closely into contact, a dc voltage e.g. −150 V is applied to the roller 11b against the cylindrical can 12 as the ground. Especially in mass production process, when accerelated ions 7 were irradiated onto the first magnetic layer 2, occasionally, the substrate 1 could not come closely into contact to the cylindrical can 12. The reason would be that somehow electrical charge on the substrate 1 due to the above-mentioned dc voltage was probably cancelled by the irradiated ions 7. And such insufficient contact results in deterioration of the substrate 1 due to heat from the evaporated atoms 14 through insufficient cooling effect of the cylindrical can 12.

Figure 5:
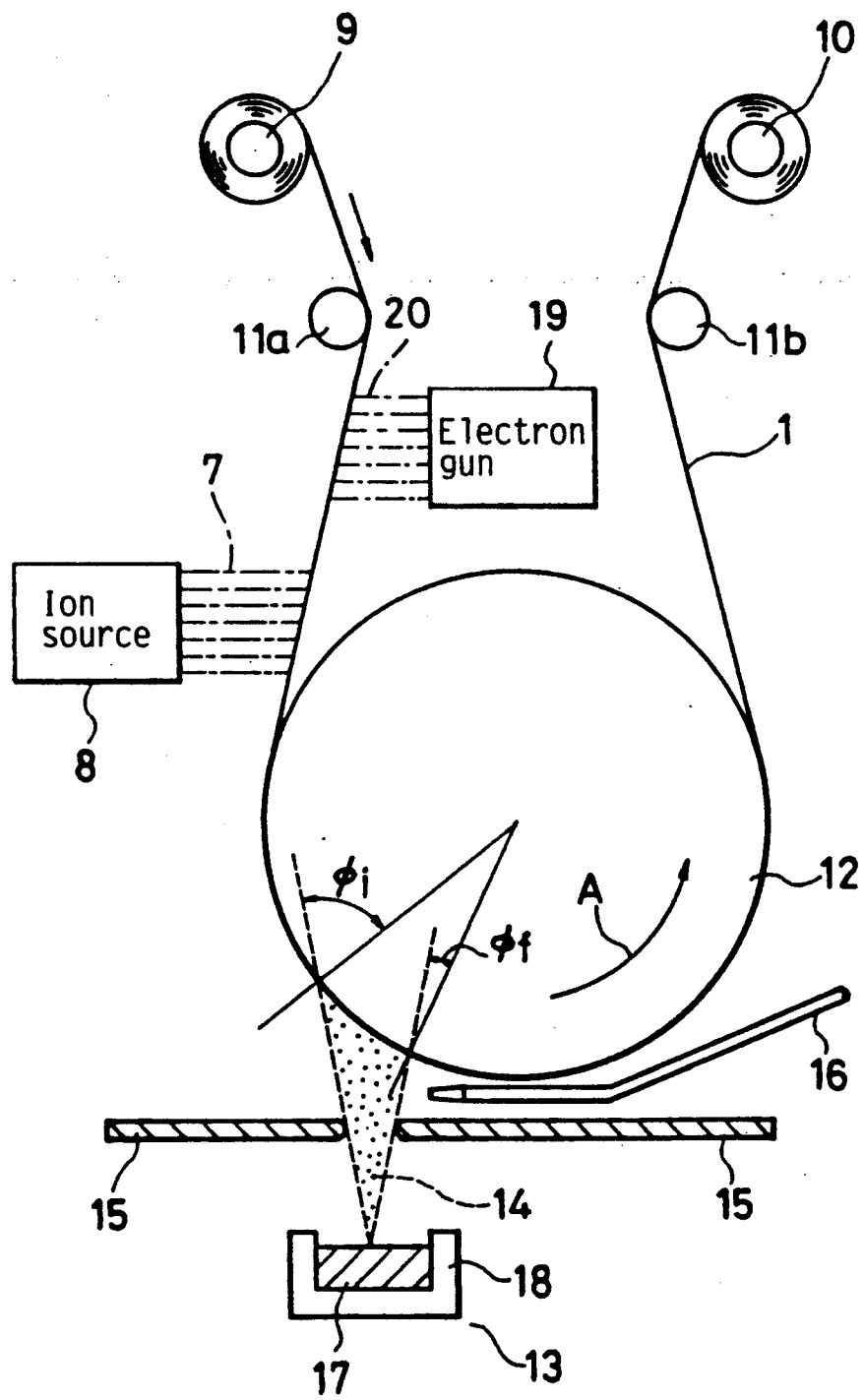
FIG. 5 is a side view of a third embodiment of a continuous vacuum evaporation apparatus for making the magnetic recording medium embodying the present invention.

Thus, for the purpose of realizing stable mass production, a third embodiment of the continuous evaporation apparatus is devided as shown in FIG. 5. Corresponding parts and components to the first embodiment are shown by the same numerals and marks, and the description thereon made in the first embodiment similarly apply. Differences and features of this third embodiment from the first embodiment are as follows. A conventional electron gun 19 was disposed in a manner that irradiation of electron beam 20 was made on a part of the substrate 1 between the guide roller 11a and the cylindrical can 12. The electron beam 20 was irradiated onto opposite face of the substrate 1 to one face covered by the first magnetic layer 2. The electron beam 20 was produced under the following condition: the accelerating voltage of electrons was 2 kV, and an emission current was 10 mA.

Tape samples obtained by utilizing the continuous evaporation apparatus shown in FIG. 5 showed the same recording/reproducing characteristic as that of the Example 1. And more stable contact of the substrate 1 with the cylindrical can 12 was obtained in mass production, and hence deterioration of the substrate due to heat was not observed, the reason would be that the substrate 1 could be charged enough by the electron beam 20 so as to make stable contact with the cylindrical can 12 even under irradiation of accelerated ions 7. The above-mentioned stable contact is explained as follows: when the electron beam was accelerated by a certain level of voltage, electrons do not remain on the surface of the substrate but penetrate into the substrate to a certain depth. Thus, the electrons are stored in the substrate stably inside thereof, that is the electrons were not cancelled by the irradiated ions 7 on opposite face of the substrate to the face irradiated by the electron beam 20, or the electrons do not flow into the ground through the cylindrical can either. Thereby, the substrate having enough charge due to the stored electrons could come closely into contact with the cylindrical can owing to electrostatic adhesion.

The above-mentioned embodiments are elucidated with respect to the examples wherein Co-Cr and Co-O were used as materials for the magnetic layers. Similar effect to the above-mentioned embodiments was obtained through our experiments, the first magnetic layer 2 and the second magnetic layer 3 were made of materials chosen from the alloys: Co-O, Co-Ni-O, Co-Cr, Co-Ni-Cr and Co-V, these alloys including at least one element selected from transition metal elements in iron group such as Fe, Cu and Mn, noble metals such as Pt and Pd, and other elements such as C, B and P as additives.

Similar effect to the above-mentioned embodiments was also obtained through our experiments, in case a soft magnetic layer such as a Ni-Fe layer is formed as the first magnetic layer 2 and a cobalt-based magnetic layer is formed as the second magnetic layer 3.

The above-mentioned embodiments are elucidated with respect to the examples having two magnetic layers, but it goes without saying that effect of the present invention is obtained in the magnetic recording medium having more than three magnetic layers. And it was confirmed through many experiments.

In case a Ti layer, a Ge layer or the like was formed on the substrate 1 as an under-coating layer, similar effect to the above-mentioned embodiments was obtained through our experiments.

As a matter of course, it is more preferable to irradiate accelerated ions 7 from the ion source 8 onto the substrate 1 immediately before forming the first magnetic layer 2.

Although the present invention has been described in terms of the presently preferred embodiments, it is to be understood that such disclosure is not to be interpreted as limiting. Various alterations and modifications will no doubt become apparent to those skilled in the art after having read the above disclosure. Accordingly, it is intended that the appended claims be interpreted as covering all alterations and modifications as fall within the true spirit and scope of the invention.

What is claimed is:

1. In a method for making a cobalt-based magnetic recording medium by continuous vacuum evaporation wherein at least two magnetic layers are formed on a substrate, the improvement comprising before forming on a previous magnetic layer a subsequent magnetic layer, irradiating accelerated ions onto a surface of said previous magnetic layer for etching an oxidized layer and/or for removing adhering impurities on the surface of said previous magnetic layer by ion etching action.

2. Method in accordance with claim 1, wherein two magnetic layers are formed on said substrate.

3. Method in accordance with claim 2, wherein said previous magnetic layer mainly comprises Co and Cr.

4. Method in accordance with claim 2, wherein said previous magnetic layer and said subsequent magnetic layer are cobalt-based magnetic layers.

5. Method in accordance with claim 4, wherein said previous magnetic layer includes at least Co and Cr and said subsequent magnetic layer includes at least Co and O.

6. Method in accordance with claim 4, wherein each of said previous magnetic layer and said subsequent magnetic layer has an axis of easy magnetization which is slant by a certain angle to the normal to the plane of said substrate.

* * * * *